Figure 1:
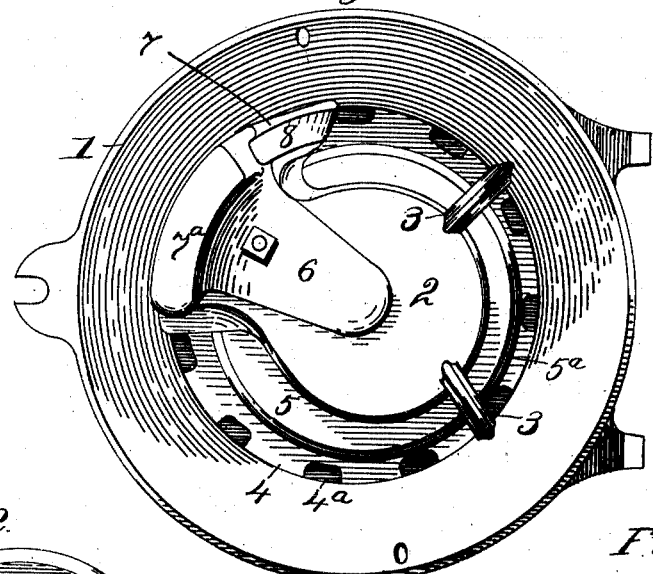

No. 760,394. PATENTED MAY 17, 1904.
E. M. HEYLMAN.
SEED PLANTER.
APPLICATION FILED AUG. 24, 1903.
NO MODEL. 3 SHEETS—SHEET 1.

Witnesses
Nora Graham.
Ina Graham.

Inventor.
Edward M. Heylman,
by L. R. Graham
his attorney.

No. 760,394. PATENTED MAY 17, 1904.
E. M. HEYLMAN.
SEED PLANTER.
APPLICATION FILED AUG. 24, 1903.
NO MODEL. 3 SHEETS—SHEET 2.
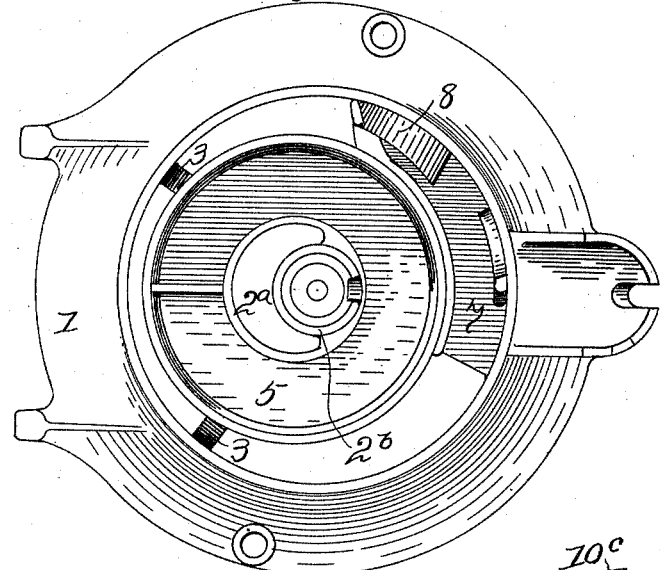
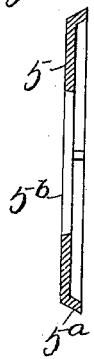
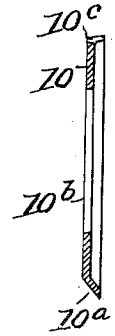
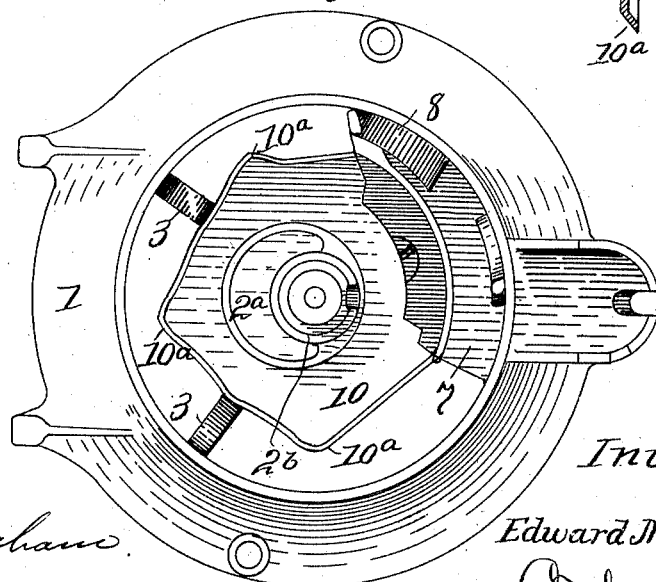
Witnesses.
Nora Graham.
Ina Graham.
Inventor:
Edward M. Heylman.
by L. P. Graham
his attorney.

No. 760,394. PATENTED MAY 17, 1904.
E. M. HEYLMAN.
SEED PLANTER.
APPLICATION FILED AUG. 24, 1903.
NO MODEL.
3 SHEETS—SHEET 3.

Witnesses.
Nora Graham.
Ina Graham.

Inventor,
Edward M. Heylman
by L. P. Graham
his attorney.

No. 760,394. Patented May 17, 1904.

UNITED STATES PATENT OFFICE.

EDWARD M. HEYLMAN, OF JANESVILLE, WISCONSIN, ASSIGNOR TO JANESVILLE MACHINE COMPANY, OF JANESVILLE, WISCONSIN, A CORPORATION.

SEED-PLANTER.

SPECIFICATION forming part of Letters Patent No. 760,394, dated May 17, 1904.

Application filed August 24, 1903. Serial No. 170,623. (No model.)

*To all whom it may concern:*

Be it known that I, EDWARD M. HEYLMAN, a citizen of the United States, residing at Janesville, in the county of Rock and State of Wisconsin, have invented certain new and useful Improvements in Seed-Planters, of which the following is a full, clear, and exact description, reference being had to the accompanying drawings, forming a part of this specification.

The invention relates more particularly to corn-planters, and has for its object to provide means whereby the planter may be adapted either for edge-drop planting or for what is commonly known as "flat-drop" planting. It is a fact well recognized by those familiar with this class of devices that corn-planters equipped with seed-plates having peripheral cells each adapted to hold a single grain of corn standing on edge give excellent results provided the grains of corn be of approximately uniform size and shape. Inasmuch, however, as most ears of corn have irregular grains, it is highly important in the use of edge-drop planters that the grains of corn shall be sorted preparatory to planting, since otherwise many of the grains of irregular shape will not enter the narrow edge-drop cells, but will accumulate in the bottom of the seedbox to such an extent as to prevent the efficient action of the planter. On the other hand, with corn-planters having flat-drop cells—*i. e.*, cells each adapted to receive a single grain lying flatwise—it is found in practice that the irregular grains will enter the broad cells and will pass beneath the usual cut-off. Hence it is that while there are various advantages incident to the use of edge-drop seed-plates there are, on the other hand, certain conditions rendering the employment of flat-drop seed-plates highly desirable; but I have found that if the seed channel or throat be of suitable width or character to deliver grains of corn to an edge-drop seed-plate it will not be of proper width or character for delivering the grains of corn to a flat-drop seed-plate. In other words, I have discovered that when one kind of seed-plate is substituted for another it is necessary to vary the feed throat or channel in order to properly deliver the grain to such substituted plate.

Figure 2:
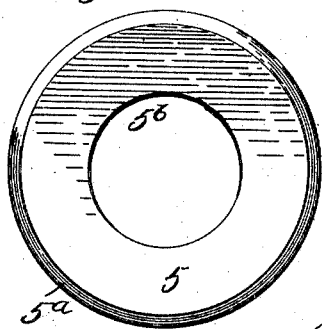
Figure 4:
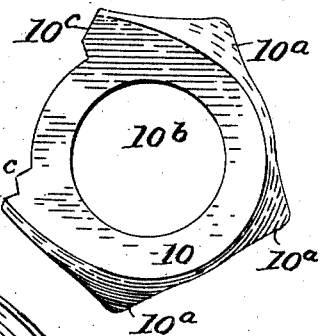
Figure 3:
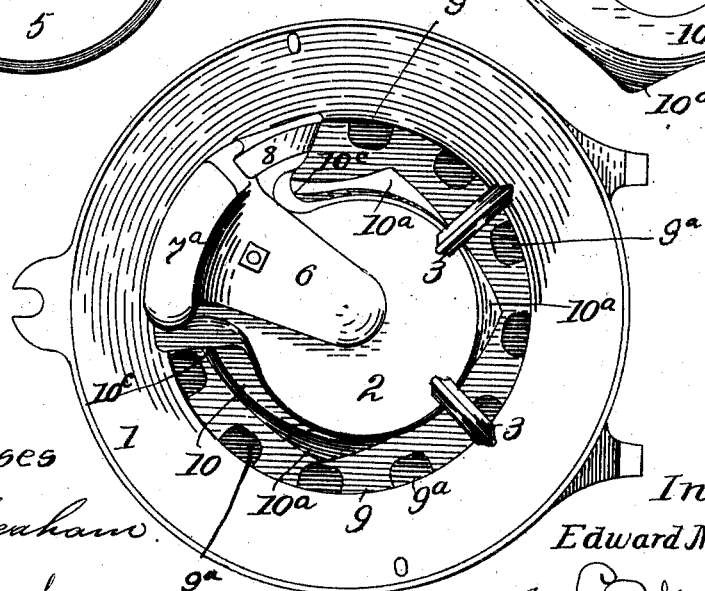
Figure 9:
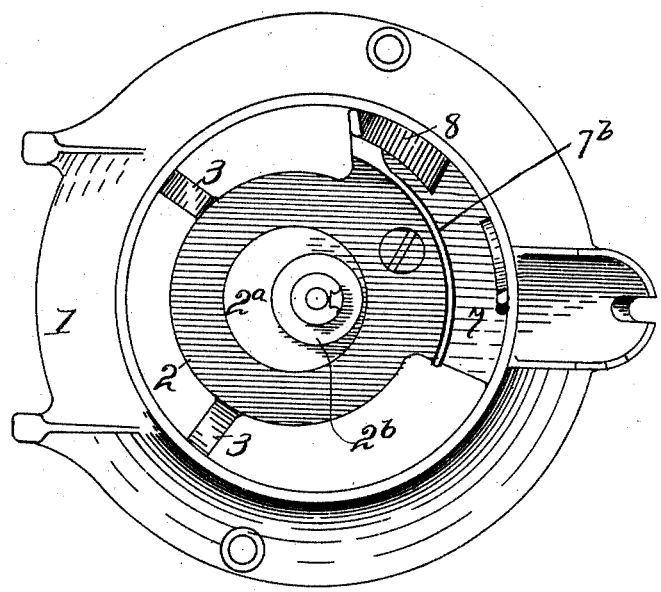
Figure 10:
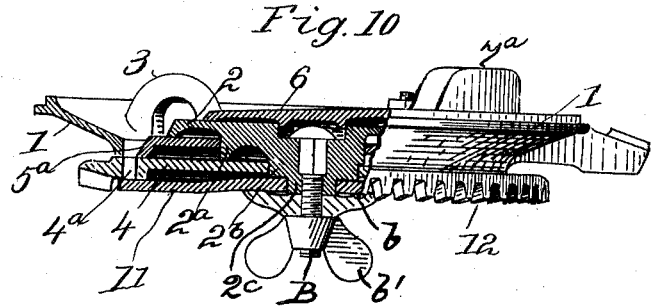
Figure 11:
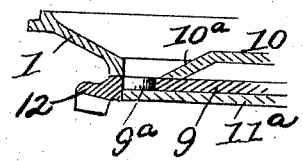
Figure 12:
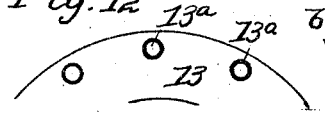

Referring to the accompanying drawings, Figure 1 is a plan view of a seed-planter adapted for the edge-drop planting of corn. Fig. 2 is a detail plan view of the circular rotatable eccentric disk that will be used to give the desired width or shape to the feed-throat when the planter is used with an edge-drop seed-plate. Fig. 3 is a plan view similar to Fig. 1, but showing a flat-drop seed-plate in position for use and showing how the feed throat or channel is correspondingly varied. Fig. 4 is a detail plan view of a stationary feed-plate which will be substituted for the feed-plate shown in Fig. 2 when the feed throat or channel is to be adapted for flat-drop planting. Fig. 5 is an inverted plan view of the seedbox-bottom, showing the feed throat or channel adapted for edge-drop planting. Fig. 6 is a view in cross-section through the feed-plate shown in Fig. 2. Fig. 7 is an inverted plan view similar to Fig. 5, but showing the feed throat or channel adapted for flat-drop planting. Fig. 8 is a view in cross-section through the feed-plate shown in Fig. 4. Fig. 9 is a plan view of the under side of the bottom plate of the seedbox, showing the bearings for the seed-plate and for the interchangeable plates whereby the width of the feet throat or channel will be varied. Fig. 10 is a view in side elevation of the dropping mechanism with parts shown in vertical section, the view illustrating the part shown in Fig. 1 of the drawings. Fig. 11 is a diametrical section through a fragment of the dropping mechanism, showing how the feed throat or channel would be varied when a flat-drop seed-plate is used. Fig. 12 is a plan of a fragment of a seed-plate.

The seedbox-bottom is shown in the accompanying drawings as comprising an outer circular rim 1 and an inner part 2, that is connected to the circular rim by integral bridge pieces or arches 3, this being one familiar form of seedbox-bottom to which my invention is applicable. The space immediately within the outer rim 1 of the seedbox-bottom constitutes the feed channel or throat through which the grain will pass to the subjacent seed-plates. On one side of the box-bottom the outer rim 1 is shown as connected with the central part 2 by a housing 7, that incloses a cut-off 8 and the usual knocker to discharge the grains. A plate 6 projects from the upper surface of the box-bottom and forms at $7^a$ a raised inclosure for the spring or springs that act upon a cut-off and knocker. A boss $2^a$ projects downward from the central part 2 of the box-bottom eccentric with respect to the seed channel or throat, and a boss $2^b$ extends downward from the boss $2^a$, concentric with the seed channel or throat.

In Figs. 1 and 10 of the drawings the seed-box-bottom is shown as provided with an edge-drop disk or seed-plate 4, the periphery of which plate is formed with a series of cells $4^a$, each adapted to receive a grain of corn standing edgewise. This seed-plate 4 is journaled upon the concentric boss $2^b$, and upon the eccentric boss $2^a$ above it is journaled the feed plate or disk 5, having an opening $5^b$ to receive the boss $2^a$ and having its periphery formed with an inclined or beveled edge $5^a$, that serves to uptilt the grains of corn, so that they may be delivered edgewise into the cells $4^a$ of the edge-drop seed-plate 4. By reference to Fig. 1 of the drawings it will be seen that the feed-plate 5 is thus held eccentrically with respect to the interior edge of the rim 1, and hence forms a feed channel or throat of varying width, and by reference to Fig. 5 it will be seen that the outer edge of the feed-plate 5 bears against a depending segmental rim $7^b$, formed upon the under side of the housing 7. The peripheral edge of the seed-plate 4 bears against the inner edge of an annular rack bar or wheel 12, by which it will be rotated, the seed-plate 4 and the wheel 12 being practically a single part, although they are cast separately and detachably interlocked. Beneath the seed-plate 4 extends a guard-plate 11, that forms a closure for the under sides of the cells $4^a$ of the plate and has the customary discharge-opening. (Not shown.) This guard-plate 11 is shown as mounted upon a boss $2^c$, that is formed beneath the boss $2^a$ and concentrically therewith. By reference to Fig. 10 of the drawings it will be seen that the feed-plate 5, the seed-plate 4, and the guard-plate 11 are held in proper relative position by means of a bolt B, extending downward through the central portion of the seed-box-bottom, this bolt B being provided with a suitable washer $b$ and wing-nut $b'$. (Shown.)

The planter as above described is adapted for edge-drop planting in the manner set forth at length in United States Letters Patent No. 699,754, granted to L. P. Graham May 13, 1902, and the specific construction of the parts above set forth is substantially the same as in Patent No. 736,257, granted to my assignee August 11, 1903. Through the eccentricity of the feed plate or disk 5 the grains of corn are forced over the cells of the seed-plate and uptilted thereinto.

When it is desired to use the planter for flat-drop planting, the seedbox will be opened from below, the guard-plate 11, the edge-drop seed-plate 4, and the edge-drop disk 5 will be removed. The operator will then not only substitute for the edge drop-feed-plate 4 the flat-drop feed-plate 9, (see Figs. 3 and 11,) but in order to properly vary the width of the feed channel or throat to permit such seed-plate to be used will insert the feed-plate 10, the preferred form of which is shown in detail in Fig. 4 and in position for use in Figs. 3, 7, and 11. This feed-plate 10 has an opening $10^b$, adapted to set over the boss $2^a$, and, as shown, one side of the feed plate or disk 10 is formed with shoulders $10^c$, adapted to abut against the end portions or shoulders of the housing 7. The size and shape of the feed-plate 10 will be such as to give to the feed channel or throat a proper width or character for delivering the grain flatwise to the cells $9^a$ of the seed-plate 9, and preferably to this end the feed-plate 10 is formed about its periphery with a series of inclined projections $10^a$, that serve to deflect the grains of corn and insure their proper delivery into the cells $9^a$ of the seed-plate 9. By reference to Fig. 11 it will be seen that the seed-plate 9 (at its outer edge) is considerably thinner than the edge-drop seed-plate 4, and it will be seen also that when the seed-plate 9 is used a guard-plate $11^a$, adapted to set within the annular gear 12, will be employed. When the feed-plate 10 and the seed-plate 9 have been placed in proper relative position, as indicated in Fig. 11 of the drawings, the guard-plate $11^a$ will be placed in position, and the planter will then be adapted for flat-drop planting of the grain.

By reference more particularly to Figs. 1 and 3 of the drawings it will be seen that the cut-off 8 is formed considerably broader than the cells $4^a$ of the edge-drop seed-plate 4, the purpose of this being to adapt the cut-off for coöperation with the broader cells $9^a$ of the flat-drop seed-plate 9, and by reference to Figs. 1 and 3 it will be seen how the width or character of the feed channel or throat is varied to permit the planter to be used with seed-plates of different kinds.

From the foregoing description it will be seen that the variation of the feed channel or throat necessary to adapt such channel or throat for the different kinds of seed-plates is effected by varying the inner wall of the channel or throat, and it is obvious that this variation of the inner wall of the channel or throat may be effected in different ways without departure from the spirit and scope of my invention. So, also, while I have shown the invention as applied to one type of corn-planter it is manifest that the invention is applicable to many other types of corn-planters which differ in detail from that shown. With the present invention the owner of a planter equipped therewith is enabled to obtain the advantages of edge-drop planting whenever he sees fit to previously sort his grain and is also enabled in an emergency to quickly change the machine for flat-drop planting if there be not time or opportunity to sort the grain.

Having thus described my invention, what I claim as new, and desire to secure by Letters Patent, is—

1. A convertible edge-drop and flat-drop seed-planter having a seedbox-bottom provided with an outer rim, a central part coöperating with said rim to form a feed-channel and means whereby that part of the bottom that coöperates with the outer rim to form the feed-channel may be varied to adapt the feed-channel for different seed-plates.

2. A convertible edge-drop and flat-drop seed-planter having a seedbox-bottom provided with means for varying the feed-channel comprising a plurality of interchangeable feed-plates.

3. A convertible edge-drop and flat-drop planter having a seedbox-bottom provided with an outer rim and means for directing the seed to the seed-plate comprising interchangeable feed-plates having vertically-inclined outer edges, said feed-plates being of different shapes and serving to vary the width of the feed-channel through which the seeds are delivered to the seed-plate.

4. A convertible edge-drop and flat-drop planter comprising a seedbox-bottom provided with a revoluble and removable seed-plate and means for varying the width of the feed-channel comprising interchangeable feed-plates, a support whereon said interchangeable feed-plates may be mounted and means for holding one of said feed-plates against rotation.

5. A convertible edge-drop and flat-drop planter mechanism having a seedbox-bottom comprising a central portion formed with a plurality of bosses, a plurality of interchangeable seed-plates each adapted to fit upon one of said bosses and a plurality of interchangeable feed-plates each adapted to fit upon another of said bosses, said feed-plates serving to vary the feed-channel through which the grain is delivered to the seed-plate.

6. A convertible edge-drop and flat-drop seed-planter comprising a seedbox-bottom having a revoluble seed-plate provided with narrow edge-drop cells, said seed-plate being removably sustained in the box-bottom, a feed-plate eccentrically disposed with respect to said bottom and adapted to direct the grain into the seed-plate cells and a cut-off considerably wider than the narrow edge-drop cells of the removable seed-plate, whereby the same cut-off can be used when a flat-drop seed-plate with broad cells is substituted for the edge-drop seed-plate.

In testimony whereof I sign my name in the presence of two subscribing witnesses.

EDWARD M. HEYLMAN.

Witnesses:
W. F. BOSWORTH,
J. A. CRAIG.